Sept. 13, 1949.                    C. W. McCOY                    2,482,017
                                 IGNITION TESTER
                             Filed March 13, 1947
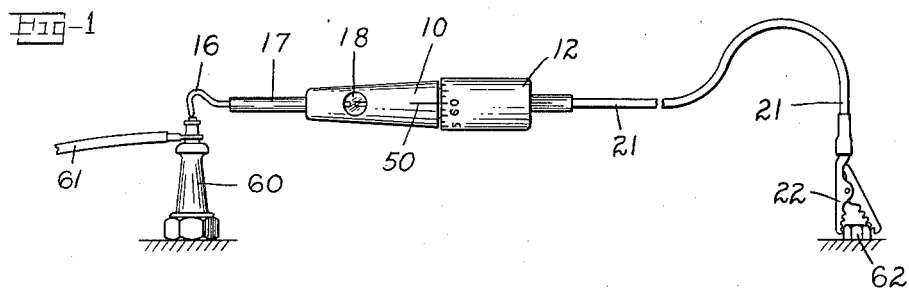
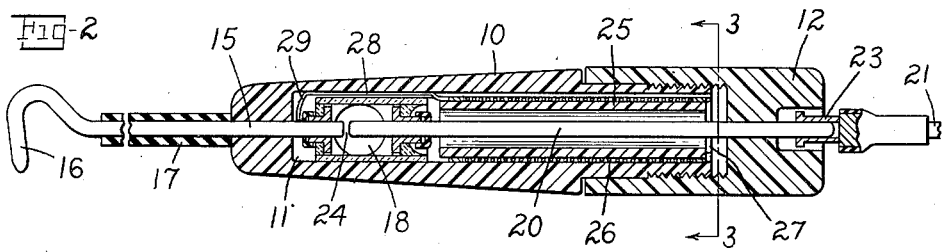
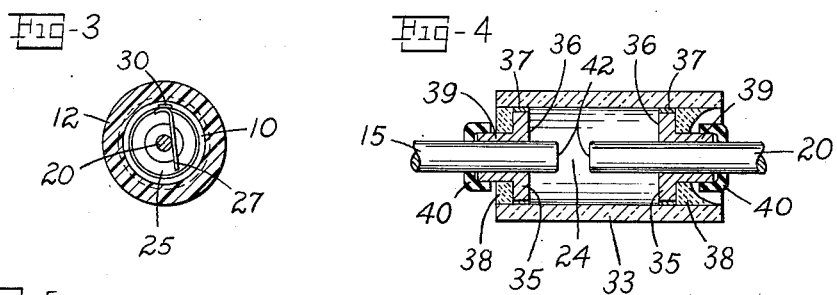
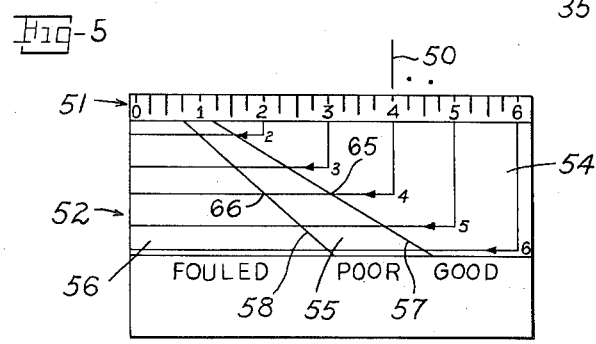
INVENTOR.
Charles W. McCoy
BY
Marechal & Biebel
ATTORNEYS Patented Sept. 13, 1949

2,482,017

UNITED STATES PATENT OFFICE 2,482,017

IGNITION TESTER

Charles W. McCoy, Dayton, Ohio

Application March 13, 1947, Serial No. 734,398

12 Claims. (Cl. 175—183)

1

This invention relates to devices for testing the ignition system of an internal combustion engine.

One of the principal objects of the invention is to provide a device for testing the spark plugs of the engine of a motor vehicle while in operation in the engine which will give accurate test results, which is inexpensive to produce, and which is sufficiently simple for ready and satisfactory use by an ordinary mechanic or like individual.

Another object is to provide such a testing device which will not be subject to variations in accuracy resulting from atmospheric conditions such as pressure or humidity, or from external electrical effects, or contamination of the immediate atmosphere as by dust, grease or the like.

It is also an object of the invention to provide a device for measuring the leakage resistance of a spark plug by comparison of the output of the coil apart from the plug under test and with the plug connected in shunt with the testing device, and which also includes a simple and convenient scale for facilitating and interpreting such measurements.

Still another object is to provide an electrical testing device having an adjustable spark gap enclosed in a transparent housing which permits ready viewing while sealing the gap from disturbing or contaminating influences which may be present in the immediate atmosphere where the device is used.

A further object is to provide an enclosed spark gap cell for incorporation in an electrical testing device which is adapted for use with either fixed or adjustable electrodes and which will provide substantially uniform atmospheric and electrostatic conditions about the spark gap in use.

Other objects and advantages of the invention will be apparent from the following description, the accompanying drawing and the appended claims.

In the drawing—

Fig. 1 is a side view in elevation showing a testing device in accordance with the invention and illustrating somewhat diagrammatically the use of the device in testing a spark plug;

Fig. 2 is a view in longitudinal section through the device of Fig. 1;

Fig. 3 is a transverse section taken on the line 3—3 of Fig. 2;

Fig. 4 is an enlarged fragmentary view in longitudinal section showing the spark plug cell of the device of Figs. 1 and 2; and

2

Fig. 5 is an enlarged developed view of the scales carried by the device as shown in Fig. 1.

In accordance with the present invention, there is provided a sprak plug checking and testing device which gives reliable results in use, which can be readily made at low cost, and which is so simple that it can be readily used effectively by ordinary mechanics, car owners, or individuals without special training or instruction. In addition, this device does not require expensive or complicated additional testing equipment or conditions, but on the contrary it is designed for testing the coil and spark plugs in actual use in the engine and without removal from the engine.

In the preferred embodiment of the invention shown in the drawing, the device includes an adjustable spark gap arranged in parallel with a fixed resistance of known value. In use, the device is first connected in series with the coil of an ignition circuit, and the gap is adjusted to the maximum length which sparks will jump at a steady rate, thus measuring the power output of the coil under the particular operating conditions of the motor. Thereafter, the device is connected in shunt with a spark plug to be tested, and by observing the extent to which the spark gap must be decreased from its initial setting obtained in the testing of the coil, the leakage resistance, and hence the efficiency of the plug, can readily be determined.

In the use of a device of this type, the accuracy of the results obtained may be subject to considerable variation by surrounding atmospheric conditions. The voltage break-down of a spark gap is dependent upon the particular dielectric interposed in the gap, the uniformity of the dielectric, and the voltage gradient, which is the electrostatic field established between the electrodes by the applied voltage. The break-down voltage is also affected both by the material and shape of the electrodes and also by foreign matter, the proximity of insulation, and the pressure, humidity and other atmospheric factors in the immediate vicinity.

The present invention provides a testing device in which the spark gap is totally enclosed in a transparent cell, thus minimizing the effect on the gap of the pressure and humidity conditions of the outside atmosphere in use, and this cell also prevents contamination of the gap by dust, grease or other foreign matter likely to be present about an engine. In addition, this cell is constructed to establish a uniform low intensity electrostatic field about the spark gap, with the exception of the area directly between the electrodes where the electrostatic field is of high intensity. Furthermore, the cell is constructed for uniform distribution of the dielectric strain, and all these factors contribute to obtaining a low initial break-down, a shorter discharge time and a faster deionization for the air dielectric. Thus the testing device of the present invention has a low impulse ratio which minimizes the effects of variation of the rates of rise of the test voltages and thus provides for stabilized readings and measurements notwithstanding variations in the testing conditions.

Referring to the drawing, and more particularly to Figs. 1, 2 and 3, the device includes a body member 10 of hard rubber or other suitable non-conducting material having a chamber 11 therein open at one end. A second body member or cap 12 similarly formed of non-conducting material is mounted for telescoping threaded engagement with the open end of body member 10 as shown in Fig. 2. An electrode 15 is mounted in body member 10 with its inner end projecting into the chamber 11 and its outer end formed to provide a hooked portion 16 as shown in Fig. 2; and it is also provided along the greater part of its length externally of the body member with an insulating sleeve 17 of rubber or other non-conducting material. The body member 10 is formed with a pair of opposed viewing apertures 18 as shown in Figs. 1 and 2, and the electrode 15 is so secured in the body member that its inner end extends into line which these viewing apertures.

A second electrode 20 is mounted in the cap 12 of the device, and its outer end extends through to the outer end of the cap to provide a terminal for attachment to a suitably insulated wire 21 for use in connecting the device in an ignition circuit for testing. As shown, this wire 21 is provided with a spring clip 22 at one end, and its other end is formed with a suitable terminal member 23 for ready attachment to the exposed terminal end of the electrode 20 as shown in Fig. 2.

It will thus be seen that the electrodes 15 and 20 form an adjustable spark gap 24 whose length may be controlled and varied by relative movement of the body members 10 and 11 along their threaded telescoping portions, and the apertures 18 provide for ready viewing of the gap from the outside of the device. A resistance of known value is also mounted in the device in parallel with the spark gap for use in measuring the voltage output of the coil of an ignition circuit. As shown in Figs. 2 and 3, this resistance consists of a hollow core or tube 25 of insulating material suitably wound with a coil of wire 26 to provide a resistance of, for example, 85,000 ohms. At its outer end, this coil is provided with a spring connector for making constant electric contact with the electrode 20; this connector being shown in Fig. 3 as a short piece of piano wire 27 or like resilient material which is soldered to the coil in such manner that its resiliency will cause it to bear constantly against the electrode. At its opposite end, the coil has a contact element 28 of spring brass or like suitable material which extends beyond the spark gap and has its outer end bent over at 29 into contact with the electrode 15. As shown in Figs. 2 and 3, the inner surface of the body member 10 may be provided with a slot 30 to receive this contact member 28.

The cell which encloses the adjustable spark gap is shown in Fig. 2 and in enlarged detail in Fig. 4. It includes a tube 33 of transparent dielectric material such as glass of such outer diameter as to fit snugly within the chamber 11. At opposite ends of this tube are annular plates 35 of brass or other suitable metal of such diameter as to fit closely within the tube 33 and having polished inner surfaces 36. The peripheries of these plates are provided with lead coatings 37 for making positive contact between the plates 35 and the inner surface of the tube 33, and the plates 35 are sealed in position by means as sealing wax 38. The central bore of each plate 35 is of such diameter as to receive one of the electrodes 15 or 20 in electrical contact therewith while still permitting movement of the electrode for adjustment of the spark gap 24. Also, these plates are provided with extended collar portions 39 to provide for ready mounting of end caps 40 of rubber or like insulating material having holes therethrough formed for close fitting engagement with the electrodes in order to seal the interior of the cell from the outside atmosphere upon insertion of the electrodes.

This cell construction thus provides for protecting the spark gap from grease, dust or other contaminating influences, and also minimizes variations of the conditions surrounding the spark gap resulting from changes in atmospheric conditions such as pressure or humidity after the device is assembled. In addition, the cell stabilizes electrostatic conditions about the spark gap. The electrodes are preferably formed with relatively flat tips 42 rounded towards their edges, as shown in Fig. 4, thus providing for establishing a concentrated electrostatic field in the gap 24 directly therebetween. The plates 35 establish a weaker and uniform electrostatic field throughout the remainder of the cell, thus facilitating ionization of the air in the gap. Also, positive contact between these plates 35 and the inner surface of the tube through the lead films 37 provides for distribution of the dielectric strain around the tube, and in addition the points of contact between the lead 37 and glass emit a radiation which assists in ionization. This results in a lower initial break-down, a shorter discharge time and a faster deionization time for the air dielectric. After a spark discharges across a gap, the ionized air becomes deionized or loses the charge by recombination and attachment, by diffusion and by deposition of charges on the tubing wall, thus normalizing the air dielectric. For stabilized indications from a spark gap voltmeter, the variations of the air dielectric should be maintained constant and the variation of the rate of rise of the voltage under measurement should have a minimum effect. The spark gap cell constructed as described and shown has a low impulse ratio which minimizes the effects of variation of the rates of rise of test voltages.

Scales and a cooperating index mark are provided on the two body members 10 and 12 for interpreting test results with the device. Referring to Figs. 1 and 5, it will be seen that the scales are carried by the cap 12, and an index mark 50 is provided on the adjacent end of the body member 10. One scale 51 is positioned adjacent the threaded end of cap 12 for registry with the index mark 50 and is appropriately calibrated for measuring the output of the coil of an ignition circuit when the device is connected in series with the coil. As shown in Figs. 1 and 5, the zero point on this scale indicates direct contact between electrodes 15 and 20, and the remainder of the scale is divided into six units covering approximately one revolution of the cap relative to body 10. These divisions of the scale may represent regular electrical units such as milliamperes, or they may merely indicate convenient relative values of coil output for correlation with the other scale 52, as will be described.

The scale 52 is used in the actual testing of a spark plug after the coil output has been determined by means of scale 51 and the device appropriately set. This scale 52 is calibrated in accordance with scale 51 to determine the leakage resistance of a spark plug and hence the efficiency of the plug, and it is used when the device is connected in shunt with a spark plug to measure the proportionate amount of the applied voltage which leaks through the plug. It is accordingly divided into a number of different sections each representing a predetermined range of percentage division of the coil output as between the device and the plug under test at the measured output of the coil.

The scale 52 in Fig. 5 is shown as composed of three sections 54, 55 and 56 separated by oblique lines 57 and 58, respectively. These different sections may conveniently be calibrated to indicate the relative efficiency of the plug under test. For example, tests indicate that a plug which is at least 75% good or not more than 25% fouled, with an approximate leakage of 350,000 to 400,000 ohms, will be satisfactory under ordinary operating conditions, that plugs which are 25% to 50% fouled, i. e., 50% to 75% good, will give faulty performance at higher power and speeds but can be used, and that plugs more than 50% fouled should be replaced. Also, it has been found that with plugs in the first group, the spark will jump gap 24 in the test device when this gap is set to 75% of its initial setting obtained when checking the coil, and that with plugs in the second group, the spark will jump gap 24 at 50% of its initial setting, but that if the plug is more than 50% fouled, the spark will not jump gap 24 even at its 50% setting.

In the use of the scale 52, the proper setting of the device is determined by adjustment of the spark gap 24 to the maximum length at which steady sparking occurs. It will be apparent that this setting is dependent upon the coil output, since the spark across the gap is provided by the proportionate amount of the output which does not leak off through the plug. Accordingly, the two scales 51 and 52 are correlated in such manner that the sections of scale 52 properly represent different proportionate leakages at different coil output values, with the lines 57 and 58 indicating, respectively, approximately 25% and 50% reductions in the length of the gap from the length at which it is set in the initial checking of the coil. In addition the three sections may be colored in contrasting colors for convenience in reading and provided with suitable legends as shown, for example, a green section 54 marked "Good," a yellow section 55 marked "Poor" and a red section 56 marked "Fouled."

As shown in Fig. 5, each of the main unit divisions of scale 51, with the exception of the first, is provided with a vertical reference line extending across scale 52 until it intersects one of a group of uniformly spaced horizontal reference lines arranged across scale 52. These reference lines are so arranged as to intersect lines 57 and 58, respectively, at points corresponding on scale 51 to 75% and 50% of the points on scale 51 represented by their respective vertical reference lines. Thus the horizontal reference line "6" intersects line 57 opposite "4.5" on scale 51 and intersects line 58 opposite "3" on scale 51, and so forth. The "1" line is not used, since a coil having so low a measured output will not assure sufficient ignition power and should be replaced.

Fig. 1 illustrates the use of the device for testing a spark plug 60. The first step in testing is to loosen the spark plug connection in such manner as to permit ready disconnection of its lead wire 61, and then to connect the test device to a good ground by means of its clip 22, as indicated at 62. The engine is then started and warmed up, preferred results with the device being obtained when the engine is running at a fast idling speed. With the engine running steadily at the desired speed, the spark plug lead 61 is disconnected from the plug and connected with the electrode 15, the hooked end 16 of this electrode providing for facilitating this step. With the parts thus connected, it will be seen that the test device is substituted for the plug itself, so that the coil of the ignition system is grounded through the device, with the resistance 26 in the device loading the output of the coil. Next the two body portions of the device are adjusted by relative rotation to the maximum length of the gap 24 between electrodes 15 and 20 which sparks will jump at a steady rate. When this maximum gap length has been determined, the relative reading of the index marker 50 and scale 51 is noted and the lead wire 61 is reconnected to the plug.

Next, and with the lead wire 61 reconnected to the plug, the test device is also connected in shunt with the plug by holding the electrode 15 in contact with the plug terminal, Fig. 1 showing the parts in these relative positions. If the plug is 100% efficient and there is no leakage therein, the spark will continue to jump the gap 24 between electrodes 15 and 20 in the same manner as before when the plug was not in the circuit. On the other hand, if there is leakage through the plug, part of the spark will be absorbed so that the output of the coil is divided between the resistance 26 and the leakage of the plug, with the result that the spark will not jump the gap in the test device at the original coil output setting.

It is accordingly necessary in completing the testing to reduce the length of the gap 24 to determine the extent of leakage in the plug and hence the relative efficiency of the plug. The scale 52 is provided to facilitate this part of the testing, and it enables the mechanic to determine quickly and easily the approximate efficiency of the plug. For example, if in the initial check of the coil the reading of scale 51 is "4" as indicated in Fig. 5, the cap 12 is rotated on the body of the device until index mark 50 is in registry with the point 65 at which the horizontal "4" line crosses the diagonal line 57, i. e. the point "3" on scale 51. The test is then repeated in the manner shown in Fig. 1, and if at this gap length sparks steadily jump the gap 24, this indicates that the plug is at least 75% efficient and hence will give satisfactory performance under ordinary conditions.

If with the device at the 75% mark, the spark still fails to jump the gap 24, the cap 12 is adjusted until the index mark is in registry with the point 66 at which the horizontal "4" line closes the diagonal line 58, i. e. a reading of "2" on scale 51. The test is then repeated as indicated in Fig. 1, and if the spark then jumps the gap, this indicates that the plug is between 50% and 75% efficient, which means that it will be satisfactory under some conditions but will give faulty performance at higher power and speeds. If the spark fails to jump the gap with the device thus adjusted to the 50% position, this shows that the plug is less than 50% efficient and should be replaced.

The above procedure can be followed for each spark plug individually, and it will be seen that it provides for quickly and easily classifying each plug as to the general range of its efficiency. The testing can of course be carried out more accurately by adjusting the gap to the particular maximum length of gap 24 which will be jumped steadily by the spark, and by comparing the resulting final reading of scale 51 with the original reading obtained when initially checking the coil. The use of contrasting colors in the scale portions 54, 55 and 56 facilitates rapid reading of the device, since the color of the scale portion in which the final reading is made will readily indicate the efficiency range of the plug. The results of the device can be rechecked by repetition at a different engine speed, since this will provide a different coil output. For such rechecking, it is important to note that the coil should again be rechecked as described before any plug is tested.

It will accordingly be seen that the present invention provides an extremely simple device for testing the spark plugs of an engine and for giving an accurate indication of the efficiency of each plug. In addition, the device is simple to use and requires no special training or understanding of the operation of the engine or ignition system under test, it being necessary only to follow the above simple directions and to note and interpret the results as described. Furthermore, the device is not only inexpensive to manufacture and comparatively rugged in use, but also its accuracy will be consistent irrespective of atmospheric conditions, dust, or other influences capable of altering conditions adjacent the gap, since the enclosed spark gap cell provides for sealing the gap as of the time the device is assembled and thus provides for readings of consistent accuracy.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. An ignition testing device of the character described comprising a body having a chamber therein, a pair of terminals carried by said body and adapted to be connected in an ignition circuit, electrodes providing an adjustable spark gap within said body chamber connected with said terminals, said body having a viewing aperture therein for ready viewing of said spark gap, a transparent cell removably mounted within said chamber in overlying relation with said spark gap and said viewing aperture, said cell being of substantially greater inner diameter than the diameter of said electrodes to provide an annular space therein of substantial cross-sectional area, means substantially closing said annular space at each end of said cell, and scale means carried by said body for interpreting the conditions under test in accordance with the maximum length of said spark gap jumped by a spark in use.

2. An ignition testing device of the character described for testing an ignition circuit having an ignition coil, comprising a body having a chamber therein, a pair of terminals carried by said body and adapted to be connected in said ignition circuit, electrodes providing an adjustable spark gap within said body chamber connected with said terminals, said body having a viewing aperture therein for ready viewing of said spark gap, a transparent cell mounted within said chamber in overlying relation with said spark gap and said viewing aperture, said cell being of substantially greater inner diameter than the diameter of said electrodes to provide an annular space therein of substantial cross sectional area, annular members at each end of said cell adapted to receive said electrodes therethrough and cooperating therewith to effect substantial closing of the ends of said cell, said cell having a snug fit within said chamber and cooperating in guided relation with the inner wall of said chamber to receive said electrodes through said annular members upon assembly of said device, means for adjusting said spark gap in accordance with the output of said coil under predetermined operating conditions, and scale means carried by said body for interpreting the conditions under test in accordance with the maximum length of said spark gap jumped by a spark in use.

3. An ignition testing device of the character described comprising a body having a chamber therein open at one end of said body and closed at the other end thereof, a cap adjustably mounted on said open end of said body, an electrode mounted in said body and having one end extending into said chamber adjacent said closed end thereof, a second electrode carried by said cap and adapted to form an adjustable spark gap with said first named electrode in response to relative movement of said body and cap, a transparent cell adapted to be received over said spark gap and having a snug fit with the inner wall of said chamber, an annular electrical resistor mounted in said chamber adjacent said open end thereof in contact with said second electrode, said chamber wall having a groove therein extending lengthwise thereof to provide passage past said cell, a resilient contact member extending from said resistor through said groove into contact with said first electrode to connect said resistor in parallel with said spark gap, and means providing terminals on said cap and body for connecting said device in an ignition circuit.

4. An ignition testing device of the character described for testing an ignition circuit having an ignition coil, comprising a body open at one end and having a chamber therein, a cap threadedly mounted on said open end of said body, an electrode mounted in said body and having one end extending into said chamber, a second electrode carried by said cap and adapted to form an adjustable spark gap with said first named electrode in response to relative movement of said body and cap, means providing terminals on said cap and body for connecting said device in said ignition circuit, and cooperating scale and index means carried one by said cap and the other by said body and calibrated in accordance with the adjustment of said spark gap to measure the output of said coil when said device is connected in series with said coil, said scale also being calibrated in accordance with said measured coil output to indicate the efficiency of a spark plug when said device is connected in shunt with said plug, and said calibration including distinctive indicia for indicating said plug efficiency in terms of relative leakage resistance at said measured coil output.

5. An ignition testing device of the character described for testing an ignition circuit having an ignition coil, comprising a pair of body members adapted for relative telescoping engagement, one of said body members having a chamber therein, a pair of electrodes mounted in said body members and each having one end extending into said chamber to form an adjustable spark gap, terminals on said body members connected with said electrodes for connecting said device in said ignition circuit, a plurality of scales carried by one of said body members, and a cooperating index mark carried by the other said body member, one of said scales being calibrated in accordance with the length of said spark gap to measure the output of said coil when said device is connected in series with said coil, the other of said scales being correlated with said first named scale to indicate the relative efficiency of a spark plug when said device is connected in shunt with said plug.

6. A testing device of the character described comprising a pair of body members adapted for relative telescoping engagement, one of said body members having a chamber therein, each of said body members having an electrode mounted therein with one end extending into said chamber to form an adjustable spark gap, a transparent enclosure for said spark gap adapted to receive said electrodes at opposite ends thereof, the inner diameter of said enclosure being substantially greater than the outer diameter of said electrodes, said electrodes having relatively flat tips rounded towards the edges thereof to establish a concentrated electrostatic field in the gap directly therebetween.

7. A testing device of the character described comprising a pair of body members adapted for relative telescoping engagement, one of said body members having a chamber therein, each of said body members having an electrode mounted therein with one end extending into said chamber to form an adjustable spark gap, a transparent enclosure for said spark gap adapted to receive said electrodes at opposite ends thereof, the inner diameter of said enclosure being substantially greater than the outer diameter of said electrodes, said electrodes having relatively flat tips rounded towards the edges thereof to establish a concentrated electrostatic field in the gap directly therebetween, and means adjacent opposite ends of said enclosure in electrical contact with said electrodes for establishing a uniform low intensity electrostatic field throughout said enclosure to facilitate ionization of the air therein.

8. An ignition testing device of the character described comprising a pair of body members adapted for relative telescoping engagement, one of said body members having a chamber therein, each of said body members having an electrode mounted therein with one end extending into said chamber to form an adjustable spark gap, a transparent enclosure for said spark gap adapted to receive said electrodes at opposite ends thereof, the inner diameter of said enclosure being substantially greater than the outer diameter of said electrodes, means adjacent opposite ends of said enclosure in electrical contact with said electrodes for establishing a uniform low intensity electrostatic field throughout said enclosure to facilitate ionization of the air therein, and means sealing said electrostatic means in electrical contact with the inner surface of said enclosure to provide for distribution of dielectric strain about said surface.

9. An ignition testing device of the character described comprising a pair of body members adapted for relative telescoping engagement, one of said body members having a chamber therein, each of said body members having an electrode mounted therein with one end extending into said chamber to form an adjustable spark gap, a transparent enclosure for said spark gap adapted to receive said electrodes at opposite ends thereof, the inner diameter of said enclosure being substantially greater than the outer diameter of said electrodes, means adjacent opposite ends of said enclosure in electrical contact with said electrodes for establishing a uniform low intensity electrostatic field throughout said enclosure to facilitate ionization of the air therein, means sealing said electrostatic means in electrical contact with the inner surface of said enclosure to provide for distribution of dielectric strain about said surface, and means providing a substantially airtight seal between said electrostatic means and said electrodes and having relatively movable engagement with one of said electrodes to provide for adjustment of said gap.

10. An ignition testing device of the character described comprising a pair of body members adapted for relative telescoping engagement, one of said body members having a chamber therein, each of said body members having an electrode mounted therein with one end extending into said chamber to form an adjustable spark gap, a transparent enclosure for said spark gap adapted to receive said electrodes at opposite ends thereof, the inner diameter of said enclosure being substantially greater than the outer diameter of said electrodes, annular metal plates adjacent opposite ends of said enclosure in electrical contact with said electrodes for establishing a uniform low intensity electrostatic field throughout said enclosure, means providing positive contact between the peripheries of said plates and the inner surface of said enclosure to effect distribution of dielectric strain about said surface, and said electrodes having relatively flat tips rounded towards the edges thereof to establish a concentrated electrostatic field in the gap directly therebetween.

11. An enclosed spark gap cell for use in an ignition testing device of the character described and comprising a transparent body of non-conducting material, annular metal plates adjacent opposite ends of said body, electrodes receivable through said plates in electric contact therewith to form a spark gap within said body with said plates establishing a uniform electrostatic field throughout said body of substantially lower intensity than the field between said electrodes, and metallic means forming an annular layer intermediate said plates and the inner surface of said body to seal the same in positive contact providing for distribution of dielectric strain about said surface.

12. An enclosed spark gap cell for use in an ignition testing device of the character described and comprising a transparent body of non-conducting material, annular metal plates adjacent opposite ends of said body, electrodes receivable through said plates in electric contact therewith to form a spark gap within said body with said plates establishing a uniform electrostatic field throughout said body of substantially lower intensity than the field between said electrodes, metallic means forming an annular layer sealing said plates in positive contact with the inner surface of said enclosure to provide for distribution of dielectric strain about said surface, and means forming a substantially air-tight seal at the outer ends of the junctions between said plates and said electrodes and constructed for relatively movable engagement with one of said electrodes to provide for adjustment of said spark gap.

CHARLES W. McCOY.

REFERENCES CITED

The following references are of record in the file of this patent:

UNITED STATES PATENTS

| Number | Name | Date |
|---|---|---|
| 1,187,670 | Spofford | June 20, 1916 |
| 1,296,101 | Meyer | Mar. 4, 1919 |
| 1,322,610 | Pfanstiehl | Nov. 25, 1919 |
| 1,735,593 | Zitzmann | Nov. 12, 1929 |
| 2,076,618 | Cooper | Apr. 13, 1937 |
| 2,397,982 | Salzberg | Apr. 9, 1946 |